United States Patent
Sheoran

(10) Patent No.: US 6,264,137 B1
(45) Date of Patent: Jul. 24, 2001

(54) INLET VORTEX BUSTOR AND ICE PROTECTOR FOR AUXILIARY POWER UNITS

(75) Inventor: Yogendra Y. Sheoran, Scottsdale, AZ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/514,203

(22) Filed: Feb. 25, 2000

(51) Int. Cl.[7] ............................. B64B 1/24; B64D 27/00
(52) U.S. Cl. .................... 244/53 B; 55/306; 60/39.092
(58) Field of Search ....................... 55/306; 244/53 B, 244/58; 60/39.02, 39.03; 137/15.1, 15.2

(56) References Cited

U.S. PATENT DOCUMENTS

| | | |
|---|---|---|
| 2,694,357 | 11/1954 | Lee . |
| 2,695,074 | 11/1954 | Kelly . |
| 2,944,631 | * 7/1960 | Kerry et al. ............................ 55/306 |
| 3,109,610 | 11/1963 | Quenzler et al. . |
| 3,421,296 | 1/1969 | Beurer, Sr. . |
| 3,952,972 | 4/1976 | Tedstone et al. . |
| 4,174,083 | 11/1979 | Mohn . |
| 4,346,860 | 8/1982 | Tedstone . |
| 4,397,431 | 8/1983 | Ben-Porat . |
| 4,418,879 | 12/1983 | Vanderleest et al. . |
| 4,899,958 | * 2/1990 | Horikawa ............................. 244/53 B |
| 5,655,359 | 8/1997 | Campbell et al. . |
| 5,694,763 | 12/1997 | Amelio et al. . |
| 5,697,394 | 12/1997 | Smith et al. . |

* cited by examiner

Primary Examiner—Charles T. Jordan
Assistant Examiner—George L. Steele
(74) Attorney, Agent, or Firm—Robert Desmond, Esq.

(57) ABSTRACT

An air inlet assembly for bringing air to an auxiliary power unit mounted in the compartment of an aircraft. The assembly includes a duct extending from an intake contoured to conform to the to the aircraft fuselage to an exit coupled to the inlet plenum of the auxiliary power unit. A first door hingeably mounted to the aft side of said intake and moveable from an open position to a closed position where said first door lies flush against intake, said first door having a closing wall and two side walls and a second door hingeably mounted to the forward end of said intake, said second door having a plate with two inwardly extending walls, each of said inwardly extending walls hinged to one of said side walls so that the second door rotates with said first door. During ground operation air that would have swirled around the side walls of the first door thus generating inlet corner vortices are now blocked by the side walls of the second door.

9 Claims, 4 Drawing Sheets

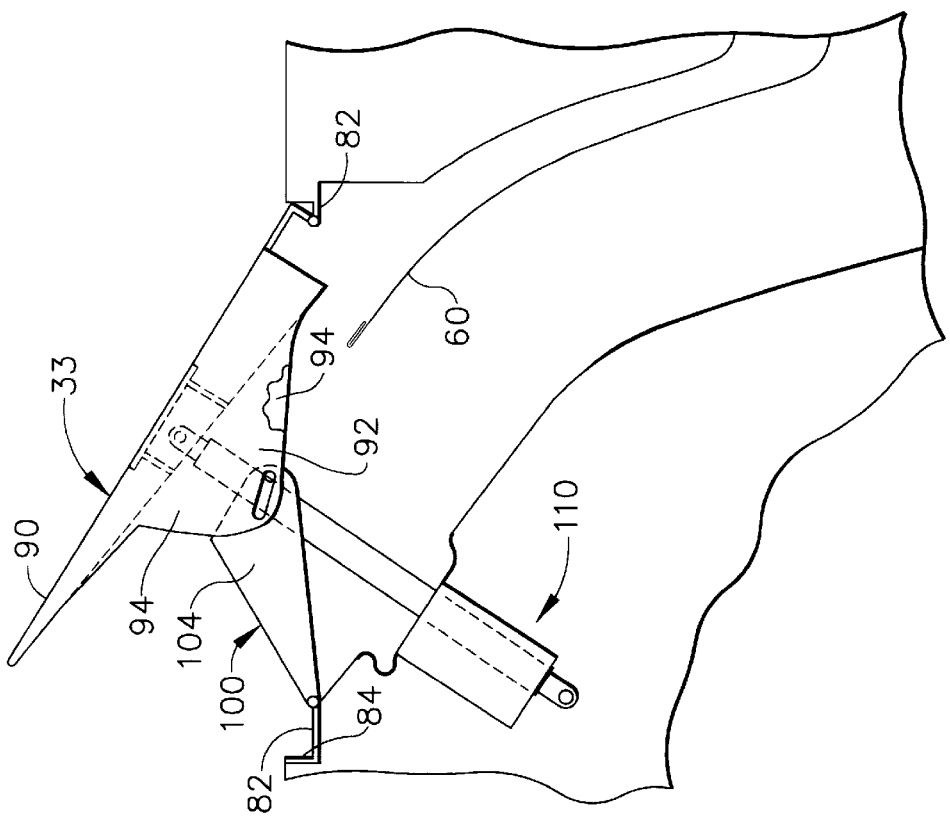
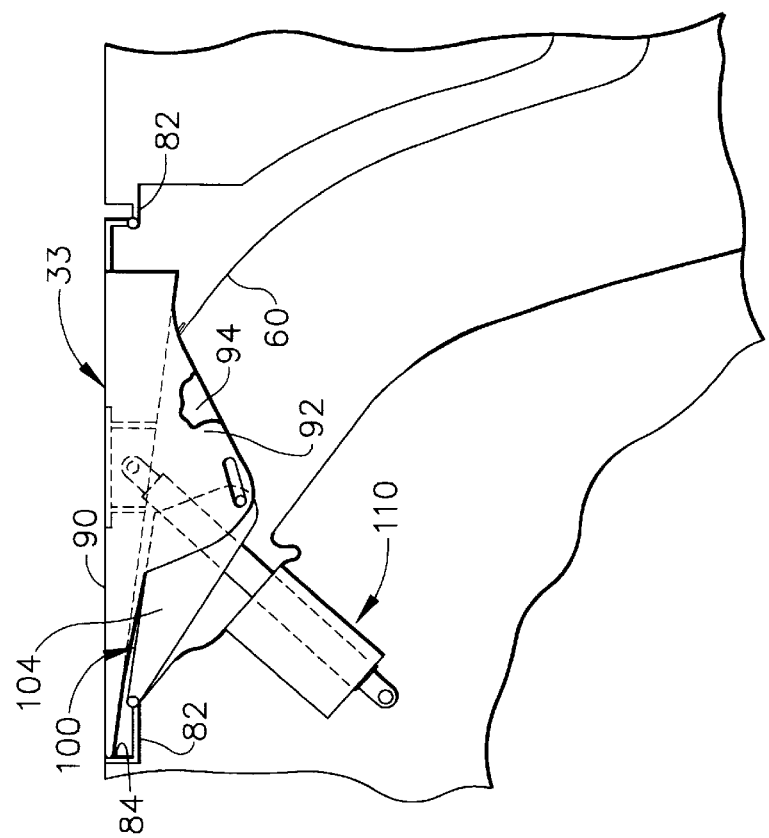
FIG. 3B
FIG. 3A

US 6,264,137 B1

INLET VORTEX BUSTOR AND ICE PROTECTOR FOR AUXILIARY POWER UNITS

TECHNICAL FIELD

This invention relates to inlets for auxiliary power units mounted in airplanes.

BACKGROUND OF THE INVENTION

Airplanes often have an on-board auxiliary power unit to provide electrical power and compressed air to various systems throughout the airplane. When the airplane is on the ground, the auxiliary power unit is the main source of power to drive the environmental control systems, air driven hydraulic pumps, and the starters for the engines. Auxiliary power units may also provide pneumatic and electric power during flight.

Campbell et al, U.S. Pat. No. 5,655,359 shows a typical arrangement for mounting an auxiliary power unit in the tailcone of an airplane. Referring to FIG. 1, an intake duct 30 extends between an intake opening 32 in the exterior surface 16 of the tailcone and the air inlet of the auxiliary power unit 10. The intake duct 30 defines an airflow passage 34 through which the auxiliary power unit 10 draws in air. An inlet door 33 is pivotally attached to the airplane 14 at the aft end of the opening 32. When the inlet door 33 is open, air flows in the direction of the arrows under the influence of the auxiliary power unit itself (ground operation) or the airstream of the airplane and the auxiliary power unit (flight operation).

These inlet doors also referred to as scoops and typically comprise a closing wall contoured to the fuselage and have channel forming side 5 plates contoured to the side walls of the inlet against which they fit upon closing. An example of such an inlet door is disclosed in Vanderleest et al, U.S. Pat. No. 4,418,879.

It has been found that during ground operation with air entering the inlet from all directions that the air flow around the side walls creates corner vortices or distortions. These vortices or distortions flow through the intake duct 30 and into the compressor inlets of the auxiliary power unit. Because air in the vortices is spinning, the leading edge of the compressor blades rotate through the vortices the incidence of the air on the leading edge flips resulting in losses and a reduction in compressor performance.

Accordingly, there is a need for an inlet door assembly that does not generate corner vortices during ground operation.

SUMMARY OF THE INVENTION

An object of the present invention is to provide an inlet door assembly that does not generate corner vortices during ground operations.

The present invention meets this objective by providing an air inlet assembly for bringing air to an auxiliary power unit mounted in the compartment of an aircraft. The assembly includes a duct extending from an intake contoured to conform to the to the aircraft fuselage to an exit coupled to the inlet plenum of the auxiliary power unit. A first door hingeably mounted to the aft side of said intake and moveable from an open position to a closed position where said first door lies flush against intake, said first door having a closing wall and two side walls and a second door hingeably mounted to the forward end of said intake, said second door having a plate with two inwardly extending walls, each of said inwardly extending walls hinged to one of said side walls so that the second door rotates with said first door.

During ground operation air that would have swirled around the side walls of the first door thus generating inlet corner vortices are now blocked by the side walls of the second door.

These and other objects, features and advantages of the present invention are specifically set forth in or will become apparent from the following detailed description of a preferred embodiment of the invention when read in conjunction with the accompanying drawings.

BRIEF DESCRIPTION OF THE DRAWINGS

FIGS. 3A and 3B are cross-sectional schematics showing the intake duct of FIG. 2 in both the open and closed position.

DESCRIPTION OF THE PREFERRED EMBODIMENT

Figure 1:
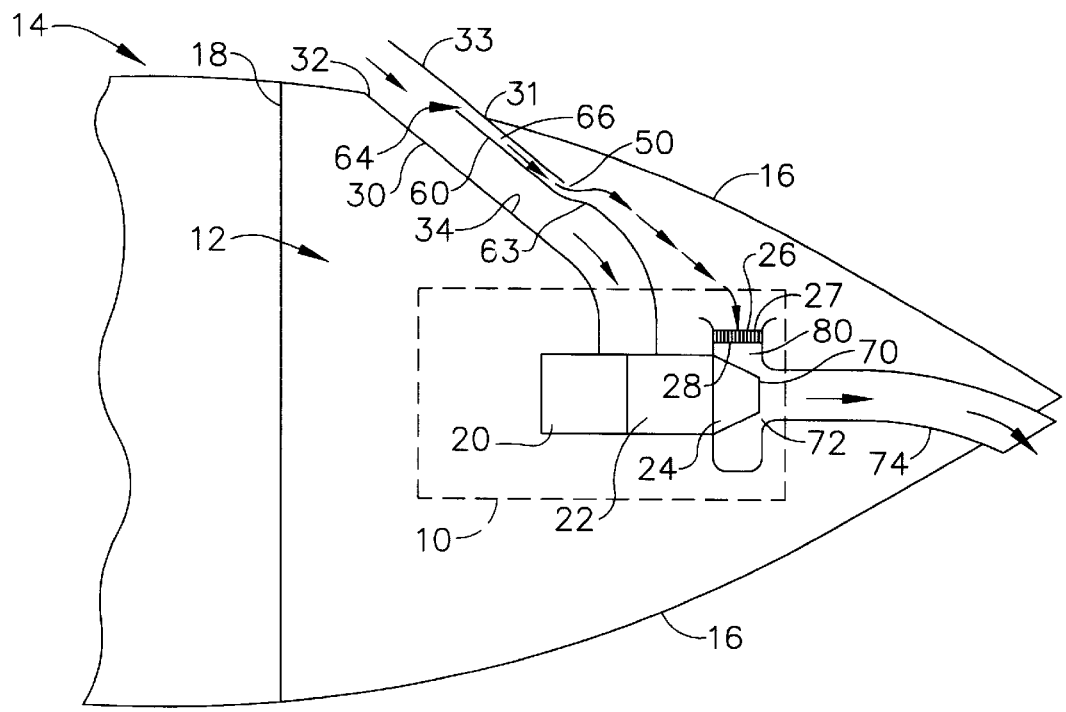
FIG. 1 is a cross-sectional schematic showing an auxiliary power unit mounted in the tailcone of an airplane.

The following description making reference to FIG. 1 is to a large degree taken from Campbell et al, U.S. Pat. No. 5,655,35 which is hereby incorporated by reference. Referring to FIG. 1 an auxiliary power unit 10 includes a load compressor 20, a power compressor 22 and a turbine 24. The auxiliary power unit 10 is positioned in a compartment 12, which is located in the aft fuselage of the airplane 14. The compartment 12 is separated from the rest of the fuselage by a firewall 18, and the exterior surfaces 16 of the airplane form the remaining walls of the compartment 12.

An intake duct 30 extends between an intake opening 32 in the exterior surface 16 and the auxiliary power unit 10. The intake duct 30 defines an airflow passage 34 through which the auxiliary power unit 10 draws its combustion air. An inlet door 33 is pivotally attached to the airplane 14 at its trailing edge 31 to open and close the inlet opening 32. When the inlet door 33 is open as shown in FIG. 1, air will flow in the direction of the arrows under the influence of the auxiliary power unit itself (ground operation) or the airstream of the airplane and the auxiliary power unit (flight operation).

An inlet scoop 60 is mounted in the intake duct 30 to divert a portion of the air flowing through the air passage 34 into the compartment 12. The inlet scoop 60 starts to extend outwardly into the air passage 34 from a point 63 downstream from an outlet 50. The scoop 60 then extends upstream through the air passage to its mouth 64. The scoop 60 defines an airflow passage 66 through which a portion of the airflow in the airflow passage 34 is diverted through the outlet 50 and into the compartment 12. In a preferred embodiment, the air is directed from the outlet 50 to a first side 27 of the oil cooler 26.

An eductor 70 is positioned along the exhaust passage 74 of the turbine 24. A vacuum duct 80 is positioned between the eductor 70 and a second side 28 of the oil cooler 26. The eductor 70 creates a low-pressure region in the vacuum duct 80. By positioning the vacuum duct 80 on the second side 28 of the oil cooler 26, the low-pressure region in the vacuum duct assists the scoop 60 in drawing air across the oil cooler 26. In preferred embodiment, the first side 27 is an exterior side of the oil cooler facing the compartment 12 and the second side 28 is an interior side facing the auxiliary power unit 10. The cooling air is then mixed with the exhaust from the auxiliary power unit 10 and expelled into the ambient environment.

Figure 2:
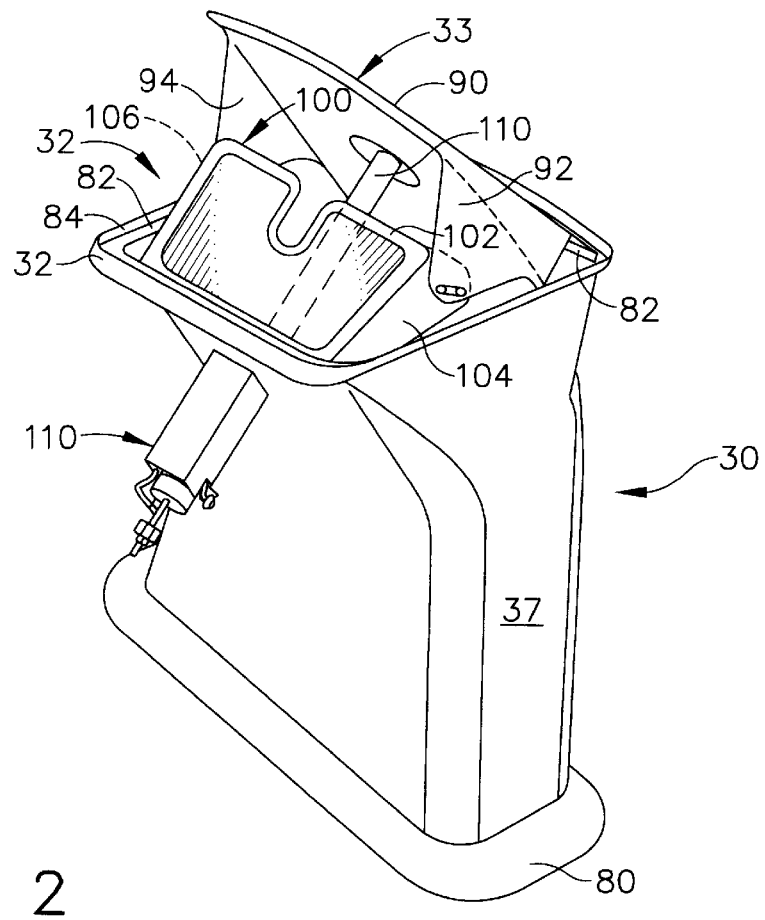
FIG. 2 is a perspective view of the auxiliary power unit intake duct having the vortex bustor contemplated by the present invention.

Referring to FIG. 2, the intake duct 30 extends has a flange 80 that mates to the inlet plenum of the auxiliary power unit and sidewalls 37 that extend from the flange 80 to the intake opening 32. The intake opening 32 is defined by an interior lip 82 that is bounded by outwardly extending wall 84. Upon mounting into the tailcone, the outer surface of the wall 84 abuts against the aircraft skin. Mounted to the aft side of the lip 82 is the inlet door or scoop 33. The inlet door 33 has a closing wall 90 and two side walls 92 and 94. A more detailed description of the inlet door 33 and how it is mounted can be found in Vanderleest, U.S. Pat. No. 4,418,879 which is hereby incorporated by reference.

Mounted to the forward end of the lip 82 is a vortex bustor 100. The vortex bustor 100 comprises main plate 102 having inwardly extending side walls 104, 106. In preferred embodiment, the plate 102 is solid. Alternatively, the plate 102 can have a screened portion. One end of the plate 102 is hinged to the lip 82 in a manner similar to the hinged connection of the inlet door 33. The opposite side of the plate 102 has a slot to accommodate an actuator 110 that opens and closes the door 33. The ends of the side walls 104 and 106 are hinged to the inner side of the side walls 92 and 94 respectively so that as the walls 92,94 move in and out the walls 104 and 106 move in and out.

FIGS. 3A and 3B show the inlet door 33 and vortex bustor 100 in both the open and closed position. In the open position (FIG. 3B), air flowing around the sidewalls is blocked by the side walls 104 and 106 thus eliminating corner vortices. Importantly, the vortex bustor 100 is sized to fold down and tuck under the door 33 as door 33 closes flush with the aircraft skin as shown in FIG. 3B.

Figure 4B:
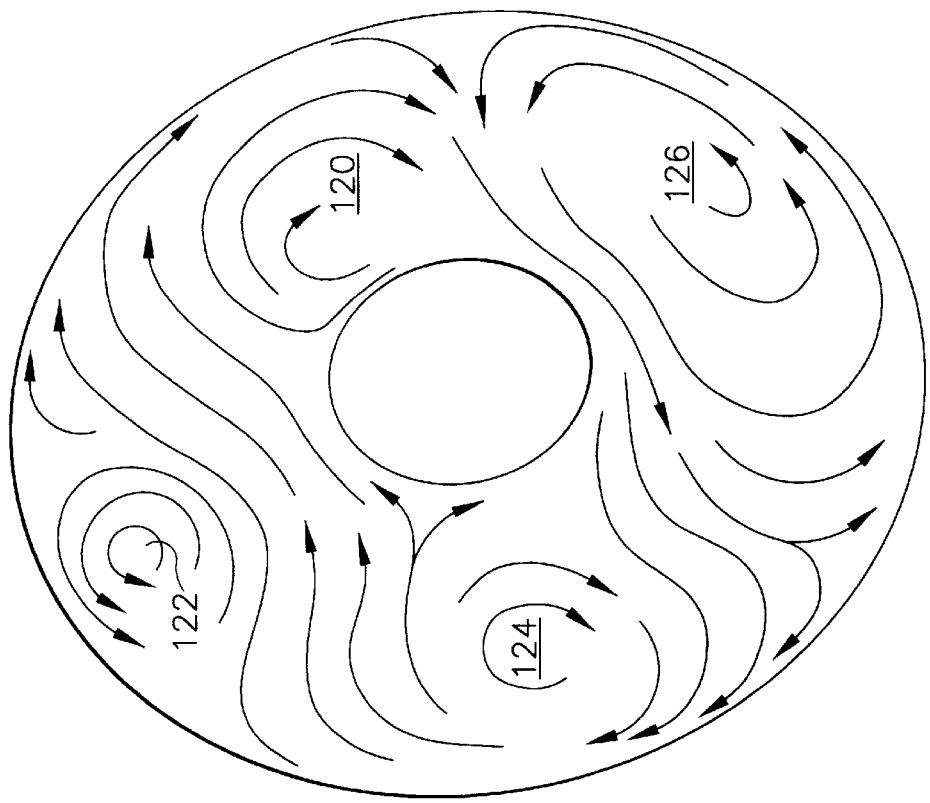
FIGS. 4A and 4B show computer generated maps of the airflow entering the auxiliary power unit compressors with and without the vortex bustor contemplated by the present invention.
Figure 4A:
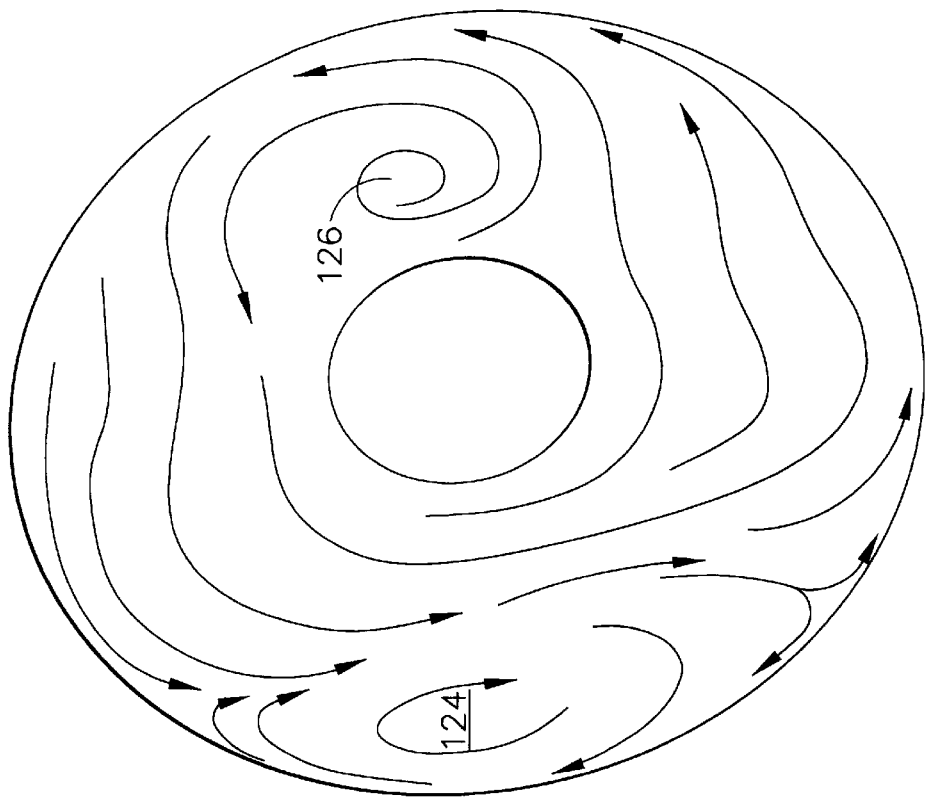

FIGS. 4A and 4B show computer generated maps of the air flowing into the compressor 22. FIG. 4B represents the configuration of an inlet door 33 having sidewalls 92, 94 but no vortex bustor 100. Four vortices appear 120, 122, 124, 126. Two of these 126, 124 are associated with the auxiliary power unit inlet plenum where the air undergoes a 90 degree turn as in flows from the duct 30 to the compressor 22. The other two vortices 122, 120 are associated with air flowing around the side walls 92, 94 and are referred to as corner vortices. FIG. 4A represents the configuration of FIG. 4B with the addition of the vortex bustor 100. Viewing FIG. 4A, the plenum effect vortices 126, 124 are still there, but the inlet corner vortices 122, 120 have been eliminated. Because the corner vortices 122, 120 are gone, the plenum vortices 126,124 readjust spatially. Thus, comparing FIG. 4A to 4B, the plenum vortices have repositioned themselves.

Figure 5:
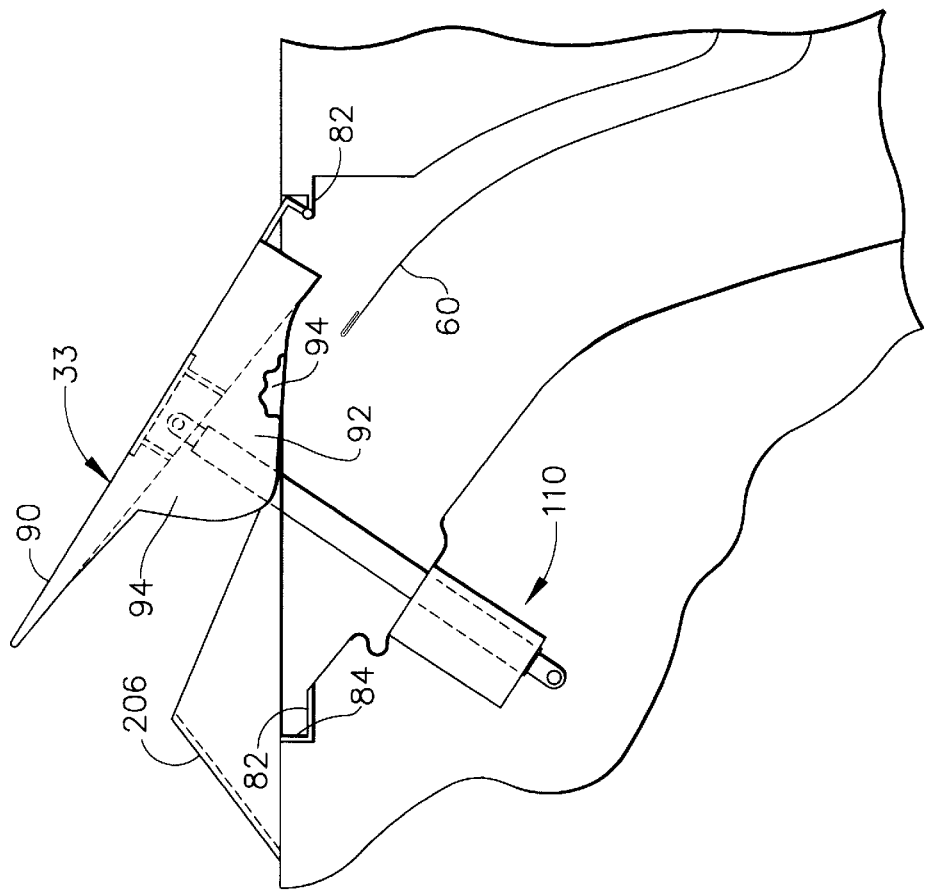
FIG. 5 is a cross-sectional schematic of an alternative embodiment of vortex bustor of FIG. 2.
Figure 6:
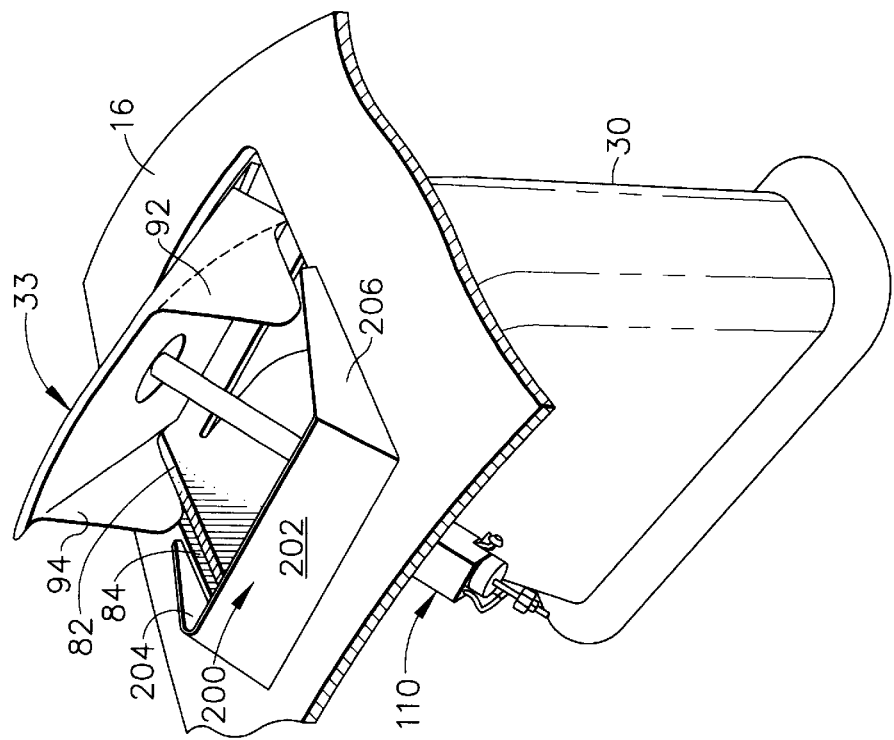
FIG. 6 is a perspective view of the vortex bustor of FIG. 5.

Referring to FIGS. 5 and 6, an alternative vortex bustor 200 is fixedly mounted to the skin 16 of the aircraft forward of the lip 82 so has not to interfere with the opening and closing of the door 33. The vortex bustor 200 comprises main plate 202 having side walls 204, 206. In preferred embodiment, the plate 202 is solid. Alternatively, the plate 202 can have a screened portion. The side wall 204 and 206 are spaced apart so as to surround the wall 84 as they extent toward the inlet door side plates 92,94. To reduce drag the walls 204, 206 are tapered.

Referring back to FIG. 3B and FIG. 5, another advantage to the vortex bustors 100 and 200 is that if you cutback the scoop 60, then during inflight operation ice particles flowing along the surface of the airplane, will be deflected into the scoop 60 and from there into the eductor 79 where they will melt. This avoids the ice particles from being ingested by the compressor 20 and 22 where they can damage the compressor blades.

It will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An air inlet assembly for bringing air to an auxiliary power unit mounted in the compartment of an aircraft comprising:

a duct extending from an intake contoured to conform to the to the aircraft fuselage to an exit coupled to the inlet plenum of the auxiliary power unit;

a first door hingeably mounted to the aft side of said intake and moveable from an open position to a closed position where said first door lies flush against said intake, said first door having a closing wall and two side walls; and a vortex bustor forward of said intake comprising a second door hingeably mounted to the forward end of said intake, said second door having a plate with two inwardly extending walls, each of said inwardly extending walls hinged to one of said side walls so that the second wall rotates with said first door.

2. The assembly of claim 1 wherein said second door is sized to fold down and tuck under the first door as the first door closes.

3. The assembly of claim 2 wherein said plate has a slot to accommodate an actuator driving said first door.

4. The assembly of claim 3 wherein said intake comprises an opening defined by an interior lip that is bounded by outwardly extending wall.

5. The assembly of claim 4 wherein the outer surface of the outwardly extending wall abuts against the aircraft fuselage.

6. The assembly of claim 1 further comprising a scoop in said duct leading to an eductor for said auxiliary power unit, said scoop positioned so that inflight with said first and second doors opened ice particles flow along along the fuselage of the aircraft are deflected by said second door into said scoop.

7. The assembly of claim 1 wherein said vortex bustor comprises a main plate fixedly mounted to the skin of said aircraft.

8. The assembly of claim 7 wherein said vortex bustor further comprises at least two side walls extending from said vortex bustor rearward and space apart to surround the sides of said intake.

9. The assembly of claim 8 wherein said side walls are tapered.

* * * * *